United States Patent [19]

Elbert

[11] 4,006,115

[45] Feb. 1, 1977

[54] PHTHALATE ESTER CONTAINING NYLON COMPOSITION

[75] Inventor: Donald Lee Elbert, Gulf Breeze, Fla.

[73] Assignee: Monsanto Company, St. Louis, Mo.

[22] Filed: Dec. 26, 1974

[21] Appl. No.: 536,670

[52] U.S. Cl. .................. 260/31.8 N; 260/37 N; 260/45.7 R; 260/45.75 B; 260/45.75 P; 260/45.75 W
[51] Int. Cl.$^2$ .................. C08K 3/22; C08K 5/12; C08L 77/00
[58] Field of Search ....... 260/31.8 N, 37 N, 45.7 R, 260/45.75 R, 45.75 B, 45.75 P, 45.75 W

[56] References Cited

UNITED STATES PATENTS

| | | | |
|---|---|---|---|
| 3,154,513 | 10/1964 | Illing et al. | 260/31.8 N |
| 3,383,353 | 5/1968 | Goto | 260/45.75 C |
| 3,418,267 | 12/1968 | Busse | 260/45.75 C |
| 3,629,174 | 12/1971 | Siclari et al. | 260/45.75 C |
| 3,730,918 | 5/1973 | Teti et al. | 260/31.8 N |
| 3,787,356 | 1/1974 | Gourse | 260/45.7 R |

*Primary Examiner*—Allan Lieberman
*Attorney, Agent, or Firm*—R. Bruce Blance; J. C. Logomasini

[57] ABSTRACT

A composition comprising a nylon resin, an additive insoluble in the nylon and from 0.1 to 10% by weight of a plasticizer that is a non-polar ester.

13 Claims, No Drawings

PHTHALATE ESTER CONTAINING NYLON COMPOSITION

BACKGROUND OF THE INVENTION

The present invention provides a nylon composition incorporating an additive that is not soluble in the nylon, which has improved toughness over the compositions of the prior art.

It has become common in the art to provide a nylon polymer with improved properties by incorporating therein certain additives that are insoluble in the polymer. (The term "insoluble" as used herein indicates that the insoluble additive is present in the polymer in the form of discrete agglomerates visible in a photomicrograph of the composition and is capable of separation from the polymer by solution of the polymer in a suitable solvent and filtration of the additive from the resulting solution.) Thus, flame retardance is commonly obtained by addition of a halogen-containing compound and a metal or metal compound, strength is conferred by blending in a mineral filler. Pigments and talc are also frequently intimately dispersed in the polymer to improve appearance.

However, the incorporation of such additives commonly leads to embrittlement of the composition and this imposes severe use limitations on them. In such a situation the commonly used plasticizers for nylon are found to be ineffective as regards increasing toughness. In his book on "Industrial Plasticizers" (MacMillan, 1963) at p. 2, I, Mellan, states that the more highly polar a resin is, the more highly polar must be the plasticizer used in conjunction with the resin. Polyamides are known to be very highly polar and in the 1974–5 edition of Modern Plastics Encyclopedia (MPE) p.248, Millan's teaching is repeated in the statement that the polarity of the polymer and the plasticizer chosen should be roughly matched for good compatibility. On the same page of MPE aliphatic glycols and aromatic sulfonamides (both highly polar) are specified as being suitable plasticizers for nylon.

We have now discovered a class of plasticizers for nylon polymer compositions incorporating additives insoluble in the nylon, that not only increase the toughness of the composition in an unexpected and unpredictable fashion but in some cases actually inprove the nylon properties in this respect on ageing.

SUMMARY OF THE INVENTION

The present invention, therefore, provides a composition comprising a nylon resin, an additive insoluble in the nylon and from 0.1 to 10% by weight of a plasticizer that is a non-polar ester.

The preferred non-polar plasticizers are selected from the fatty acid esters of pentaerythritol and the esters to $C_6$ to $C_{10}$ aliphatic and aromatic acids such as phthalic, sebacic and adipic acids. In the former group the acid component of the ester is a fatty acid and it is to be understood that the term is herein used to described saturated monobasic acids having from 8 to 20 carbon atoms such as for example pelargonic acid, palmitic acid, stearic acid, lauric acid and capric acid. Thus suitable non-polar plasticizers of this group include the tetra-isostearate, tetra-pelargonate, tetra-palmitate, tetra-stearate, tetra-laurate and tetra-caprate of pentaerythritol.

The latter group of non-polar plasticizers comprises the esters of $C_6$ to $C_{10}$ aliphatic and aromatic acids. The esterifying group may be derived from an alkyl or cycloalkyl alcohol or from a phenol. The ester should, of course, have a boiling point such that it will not volatalize from the system during processing of the nylon composition. In practice, the esterifying group should have at least four carbon atoms and preferably from 8 to 12 carbons. Suitable esters of this class include dibutyl adipate, dibutyl sebacate, dibutyl phthalate, dihexyl adipate, dihexyl sebacate, dihexyl phthalate, dicyclohexyl adipate, dicyclohexyl phthalate, dioctyl adipate, dioctyl sebacate, dioctyl phthalate, diisodecyl adipate, diisodecyl sebacate, diisodecyl phthalate, diundecyl adipate, diundecyl sebacate, diundecyl phthalate, didodecanyl adipate, didodecanyl sebacate, didodecanyl phthalate, diphenyl phthalate, diphenyl sebacate and diphenyl adipate.

The non-polar plasticizer is present in an amount that is from 0.1 to 10% by weight of the resin composition. In practice however, it is found that from 0.5 to 8% and more preferably from 1 to 5% by weight is adequate to confer the advantages described in some degree.

The nylon base for the composition can be selected from any of the polyamides commonly referred to as nylons and thus includes for example, nylon 6, nylon 6,6, nylon 6,9, nylon 6,10, nylon 11 and nylon 12, as well as copolymers of one nylon with another as for example, nylon 6/6,6 and nylon 6/6,9.

The nylon-insoluble additives that may be present include pigments such as titanium dioxide; granular or fibrous fillers such as asbestos, glass-fibre, calcined clays, talc, silica and the like; flame-retardant synergists such as zinc, zinc oxide, zinc bromate, ferrous and ferric oxides, alumina, antimony trioxide and the like; and heat stabilizing additives such as copper salts, particularly copper iodide, and the like.

The plasticized compositions of the invention have been found to be especially useful in the production of flame-retardant nylon resin grades that incorporate halogenated hydrocarbon flame-retardant additives such as decabromodiphenyl ether, hexabromo diphenyl, octabromodiphenyl, and the products sold by Hooker Chemical Corporation under the trade names Dechlorane Plus 25, Dechlorane Plus 515, Dechlorane 602 and Dechlorane 603. Such additives are commonly used with a metallic or metallic compound synergist such as those indicated above of which the most frequently used are antimony trioxide and ferric oxide.

The amount of nylon-insoluble additive present in the composition varies with the purpose for which it is added. Thus a filler may be present in an amount that can be from 5 to 50% of the total composition weight and a flame retardant synergist may be present in an amount that is from 1 to 10% of the total composition weight. In general the deleterious effect on the nylon toughness is encountered when any amount of nylon-insoluble compound is present.

Other advantages are conferred when the composition further comprises a heat stabilizing additive such as, for example, a copper salt such as cuprous iodide, cupric acetate or copper lithium iodide and the like. Such heat stabilizing additives can conventionally be present in an amount that is from about 20 to 500 or even 1000 ppm and preferably from 100 to 200 ppm of the total composition. In the presence of such additives, the compositions of the invention actually show an improvement with time in respect of toughness, (as reflected by its tensile elongation at fail), over compounds not containing the non-polar plasticizer.

SPECIFIC EMBODIMENTS

The compositions of the invention are described in more detail with reference to the following Examples which are for the purpose of illustration only and are not to be understood as indicating or implying and limitation on the borad invention described herein. Except where otherwise stated, all parts are by weight.

EXAMPLE 1 (Comparative)

To 84 parts of a nylon 6/6.6 copolymer containing 6% of nylon 6, were added 5.2 parts of ferric oxide, 10.5 parts of Dechlorane Plus 25, (a flame retardant sold by Hooker Chemical Corporation comprising 65% of a chlorinated alicyclic compound and described in U.S. Pat. No. 3,382,204 at column 4, line 15) and 0.3 parts of an antioxidant which is a condensation product of Phenyl-benta-naphthylamine and acetone sold by Uniroyal under the trade name Betanox. These are mixed in a high intensity mixer, compounded in a 24:1 L/D melt extruder, at 260°–265° C. and remelted and extruded into a 3.3 mm diameter strand and chopped into pellets.

Test specimens were molded from the pellets at 260°–265° C. and tested for tensile elongation at fail by the method described in ASTM Designation D638-72, (type 1 specimen, speed C, 5 specimens).

The results of this test are set forth in Table 1.

Examples 2–6 (Comparative)

The following Examples illustrate the effect of using a polar plasticizer on nylon compositions comprising a nylon-insoluble additive. All samples were based on the same nylon 6/66 copolymer as was used in Example 1 and were prepared and tested by the method described in Example 1. The samples had the following compositions.

| Example 2 | 83 parts of the nylon 6/66 copolymer resin |
| | 2.0 parts of N-methyl toluene sulfonamide (polar) |
| | 5.0 parts of ferric oxide |
| | 10.0 parts of Dechlorane Plus 25 |
| Example 3 | 82 parts of the nylon 6/66 copolymer resin |
| | 3.0 parts of N-methyl toluene sulfonamide (polar) |
| | 5.0 parts of ferric oxide |
| | 10.0 parts of Dechlorane Plus 25 |
| Example 4 | 83 parts of the nylon 6/66 copolymer resin |
| | 2.0 parts of 32% chlorinated terphenyl (polar) |
| | 5.0 parts of ferric oxide |
| | 10.0 parts of Dechlorane Plus 25 |
| Example 5 | 82 parts of the nylon 6/66 copolymer resin |
| | 3.0 parts of 32% chlorinated terphenyl (polar) |
| | 5.0 parts of ferric oxide |
| | 10.0 parts of Dechlorane Plus 25 |
| Example 6 | 84 parts of the nylon 6/66 copolymer resin |
| | 1.0 parts of 54% chlorinated biphenyl (polar) |
| | 5.0 parts of ferric oxide |
| | 10.0 parts of Dechlorane Plus 25 |

The following Examples, which illustrate the invention, show the effect of using non-polar plasticizer. Samples were prepared and tested in the manner set forth in Example 1 and the results of the tests are shown in Table 1. The samples tested had the following compositions.

| Example 7 | 83.5 parts of the nylon 6/66 copolymer resin |
| | 1.5 parts of pentaerythritol tetra-isostearate (non-polar) |
| | 5.0 parts of ferric oxide |
| | 10.0 parts of Dechlorane Plus 25 |
| Example 8 | 83.5 parts of the nylon 6/66 copolymer resin |
| | 1.5 parts of diundecyl phthalate (non-polar) |
| | 5.0 parts of ferric oxide |
| | 10.0 parts of Dechlorane Plus 25 |
| Example 9 | 83.0 parts of the nylon 6/66 copolymer resin |
| | 2.0 parts of diundecyl phthalate (non-polar) |
| | 5.0 parts of ferric oxide |
| | 10.0 parts of Dechlorane Plus 25 |
| Example 10 | 83.5 parts of the nylon 6/66 copolymer resin |
| | 1.5 parts of dioctyl phthalate (non-polar) |
| | 5.0 parts of ferric oxide |
| | 10.0 parts of Dechlorane Plus 25 |
| Example 11 | 83.5 parts of the nylon 6/66 copolymer resin |
| | 1.5 parts of di-isodecyl phthalate (non-polar) |
| | 5.0 parts of ferric oxide |
| | 10.0 parts of Dechlorane Plus 25 |
| Example 12 | 83.5 parts of the nylon 6/66 copolymer resin |
| | 1.5 parts of dioctyl phthalate (non-polar) |
| | 5.0 parts of ferric oxide |
| | 10.0 parts of Dechlorane Plus 25 |
| Example 13 | 82.3 parts of the nylon 6/66 copolymer resin |
| | 2.0 parts of diundecyl phthalate |
| | 5.2 parts of ferric oxide |
| | 10.5 parts of Dechlorane Plus 25 |
| | 150 p.p.m. of cuprous iodide |

TABLE I

| EXAMPLE | PLASTICIZER TYPE | TENSILE ELONGATION AT FAIL (%) |
|---|---|---|
| 1 | None | 25.6 |
| 2 | Polar | 9.0 |
| 3 | Polar | 13.0 |
| 4 | Polar | 14.0 |
| 5 | Polar | 21.0 |
| 6 | Polar | 8.0 |
| 7 | Non-polar | 36.5 |
| 8 | Non-polar | 45.3 |
| 9 | Non-polar | 59.6 |
| 10 | Non-polar | 50.7 |
| 11 | Non-polar | 40.0 |
| 12 | Non-polar | 35.0 |
| 13 | Non-polar | 58.5 |

As can be seen from the above Table 1 the use of a non-polar plasticizer has a markedly superior effect on the toughness of the composition, (as reflected by the tensile elongation at fail), than does a polar plasticizer.

In addition, all the above samples obtained a flame-retardant rating of V-O when run according to Underwriters Laboratory Test No. UL-94 on one-thirtysecond inch bars (Section 3, Vertical Burning).

A further unexpected result obtained from the composition of Example 13 is that the tensile elongation at fail actually improved upon heat ageing and on dry storing contrary to all experience of the known properties of nylon. The comparison of the samples produced from Examples 1 and 13 is shown on Table 2 below.

TABLE 2

|  | Ex 1 | Ex 13 |
|---|---|---|
| Original Tensile Elongation | 25.6% | 58.5% |
| after 8 hrs. at 200° C. | 4% | 74% |
| after 90 hrs. dry storage | 13% | 104% |

It is clear, that the compositions of the present invention have substantial and unexpected advantages over those of the prior art.

It is foreseen that many minor non-essential variations in the formulation of the nylon compositions of the invention could be made without departing from the essential spirit thereof. It is intended that all such variations should likewise be included within the purview of the present invention.

What is claimed is:

1. A composition of matter comprising a nylon resin, an additive insoluble in the nylon resin selected from the group consisting of fillers, and flame-retardant synergists and from 0.1 to 10 percent by weight of a phthlate ester of a $C_4$ to $C_{12}$ alkyl or cycloalkyl alcohol or a phenol, wherein the filler is from 5 to 50 weight percent of the total composition and the flame-retardant synergist is from 1 to 10 weight percent of the total composition.

2. The composition of matter according to claim 1 in which the ester is diundecyl phthalate.

3. The composition of matter according to claim 1 in which the filler is a particulate mineral.

4. The composition of matter according to claim 1 in which the ester is selected from the group consisting of, dibutyl phthalate, dihexyl phthalate, dicyclohexyl phthalate, dioctyl phthalate, diisodecyl phthalate, diundecyl phthalate, didodecanyl phthalate and diphenyl phthalate.

5. A composition of matter comprising a nylon resin, a flame-retardant additive, from 1 to 10 weight percent of a flame-retardant synergist insoluble in the nylon resin and from 1 to 5 weight percent of a phthalate ester of a $C_4$ to $C_{12}$ alkyl or cycloalkyl alcohol or phenol.

6. The composition of matter according to claim 5 in which the flame retardant synergist is selected from ferric oxide, zinc oxide and antimony tri-oxide.

7. A composition of matter comprising a polymer or copolymer of nylon 6,6, an halogenated hydrocarbon flame retardant, from 1 to 10 percent by weight of a flame-retardant synergist selected from ferric oxide and antimony tri-oxide, from 100 to 200 ppm of cuprous iodide and from 1 to 5 percent by weight of diundecyl phthalate.

8. A composition of matter comprising a polymer or copolymer of nylon 6,6, a flame retardant additive, from 1 to 5 weight percent of a flame-retardant synergist insoluble in the nylon resin and from 1 to 5 weight percent of a phthalate of a $C_4$ to $C_{12}$ alkyl or cycloalkyl alcohol or phenol.

9. The composition of matter according to claim 8 in which the flame retardant additive is an halogenated hydrocarbon and the synergist is selected from ferric oxide, zinc oxide and antimony tri-oxide.

10. The composition of matter according to claim 8 that comprises from 20 to 500 ppm of heat-stabilizing additive.

11. The composition of matter according to claim 8 that comprises from 100 to 200 ppm of cuprous iodide.

12. The composition of matter according to claim 8 in which the ester is selected from the group consisting of dibutyl phthalate, dihexyl phthalate, dicyclohexyl phthalate, dioctyl phthalate, diisodecyl phthalate, diundecyl phthalate, didodecanyl phthalate, and diphenyl phthalate.

13. A composition of matter comprising a polymer or copolymer of nylon 6,6, an halogenated hydrocarbon flame retardant, from 1 to 10 parts by weight of a flame-retardant synergist selected from ferric oxide and antimony tri-oxide, from 100 to 200 ppm of cuprous iodide and from 1 to 5 parts by weight of diundecyl phthalate.

* * * * *